United States Patent
Schuster et al.

(10) Patent No.: US 10,035,546 B2
(45) Date of Patent: Jul. 31, 2018

(54) SUPPORT DEVICE FOR A FRONT END OF A PASSENGER MOTOR VEHICLE

(71) Applicant: Bayerische Motoren Werke Aktiengesellschaft, Munich (DE)

(72) Inventors: Horst Schuster, Olching (DE); Wilhelm Riedl, Pfaffenhofen (DE); Oeztzan Akif, Munich (DE); Gerhard Fichtinger, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/472,565

(22) Filed: Mar. 29, 2017

(65) Prior Publication Data

US 2017/0197663 A1 Jul. 13, 2017

Related U.S. Application Data

(63) Continuation of application No. PCT/EP2016/063680, filed on Jun. 15, 2016.

(30) Foreign Application Priority Data

Jun. 23, 2015 (DE) .................. 10 2015 211 544

(51) Int. Cl.
  *B62D 25/08* (2006.01)
  *B62D 21/15* (2006.01)
(52) U.S. Cl.
  CPC ......... *B62D 25/082* (2013.01); *B62D 21/152* (2013.01); *B62D 25/08* (2013.01)
(58) Field of Classification Search
  CPC ... B62D 25/082; B62D 25/085; B62D 21/152
  (Continued)

(56) References Cited

U.S. PATENT DOCUMENTS 9,457,746 B1 * 10/2016 Baccouche ............. B60R 19/34
2014/0062106 A1 3/2014 Han
(Continued)

FOREIGN PATENT DOCUMENTS

DE 10 2013 007 896 A1 11/2014
DE 10 2013 018 078 A1 5/2015
(Continued)

OTHER PUBLICATIONS

International Search Report (PCT/ISA/210) issued in PCT Application No. PCT/EP2016/063680 dated Jan. 9, 2017 with English translation (five pages).
(Continued)

*Primary Examiner* — Jason S Morrow
(74) *Attorney, Agent, or Firm* — Crowell & Moring LLP

(57) ABSTRACT

A support device for a front end of a passenger motor vehicle includes at least one vehicle body component extending in the vehicle vertical direction, by which respective longitudinal support elements, which are associated on the sides, of respective longitudinal support planes are connected to each other. A transverse support of a front end module is retained on the body of the passenger motor vehicle. At least a first support element is provided on the body component on a side facing outwardly in relation to the transverse direction of the vehicle and has a receptacle. At least a second support element is arranged outside of the body component in relation to the transverse direction of the vehicle, provided on the transverse support and extends rearwardly from the transverse support. In an initial state of the support device, the second support element is spaced apart from the first support element and, as a result of a corresponding accident-caused application of force, it is displaced at least partially into the receptacle, thereby supporting the first support element.

11 Claims, 4 Drawing Sheets

(58) Field of Classification Search
USPC ............... 296/187.09, 187.1, 193.09, 203.02
See application file for complete search history.

(56) References Cited

U.S. PATENT DOCUMENTS

| | | | |
|---|---|---|---|
| 2014/0183833 A1* | 7/2014 | Takeshita | B62D 25/082 |
| | | | 280/124.109 |
| 2014/0354008 A1 | 12/2014 | Sakakibara et al. | |
| 2014/0367985 A1 | 12/2014 | Weil et al. | |
| 2015/0175109 A1* | 6/2015 | Mori | B60R 19/34 |
| | | | 293/133 |
| 2015/0329144 A1* | 11/2015 | Hara | B62D 21/152 |
| | | | 296/187.09 |
| 2016/0101754 A1 | 4/2016 | Kohlmann et al. | |
| 2017/0259852 A1* | 9/2017 | Akif | B62D 21/152 |

FOREIGN PATENT DOCUMENTS

| | | |
|---|---|---|
| DE | 10 2014 206 674 A1 | 10/2015 |
| EP | 2 647 551 A1 | 10/2013 |
| EP | 2 719 565 A1 | 4/2014 |

OTHER PUBLICATIONS

German-language Written Opinion (PCT/ISA/237) issued in PCT Application No. PCT/EP2016/063680 dated Jan. 9, 2017 (six pages).
German Search Report issued in counterpart German Application No. 10 2015 211 544.5 dated Jan. 26, 2016 with partial English translation (13 pages).

* cited by examiner

SUPPORT DEVICE FOR A FRONT END OF A PASSENGER MOTOR VEHICLE

CROSS REFERENCE TO RELATED APPLICATIONS

This application is a continuation of PCT International Application No. PCT/EP2016/063680, filed Jun. 15, 2016, which claims priority under 35 U.S.C. § 119 from German Patent Application No. 10 2015 211 544.5, filed Jun. 23, 2015, the entire disclosures of which are herein expressly incorporated by reference.

BACKGROUND AND SUMMARY OF THE INVENTION

A frontal collision during which a passenger motor vehicle collides with an accident partner or an obstacle with a small width overlap is also called a small-overlap crash. In this case, the accident partner or the barrier impacts at least essentially in a straight direction on the front and thereby the front end of the passenger motor vehicle. Furthermore, collisions may occur in which the accident partner or the barrier impacts diagonally from the front on the front end of the passenger motor vehicle. Such an impact of an accident partner or an obstacle diagonally from the front on the front end of a passenger motor vehicle is also called an oblique crash or frontal oblique crash. Such frontal collisions represent a great challenge to the front end of a passenger motor vehicle. In this respect, it is known that it is problematic that the passenger motor vehicle is acted upon by accident-caused force in the area of its front end on the exterior side of a respective main longitudinal support.

It is therefore an object of the present invention to create a support device for a front end of a passenger motor vehicle, by which a particularly advantageous crash behavior of the passenger motor vehicle can be implemented.

This and other objects are achieved according to the invention by a support device, as well as a vehicle having the support device, in accordance with embodiments of the invention.

The support device according to the invention for a front end of a passenger motor vehicle has at least one vehicle body component extending at least essentially in the vertical direction of the vehicle, by which vehicle body component respective laterally assigned longitudinal support elements of corresponding longitudinal support planes are mutually connected.

The longitudinal support planes and, therefore, the assigned longitudinal support elements are arranged above one another or consecutively. The support device further has a transverse support of a front end module held at the body of the passenger motor vehicle. In contrast to the vehicle body component, the transverse support is therefore not a component of the body of the passenger motor vehicle or on the vehicle body, but rather the transverse support is a component of the front end module which is joined to the vehicle body. The transverse support is therefore, for example, a component of a bumper and is also called a bending transverse support.

Furthermore, the support device has at least a first support element, which is provided on the vehicle body component on a side facing outward in the transverse direction of the vehicle. The support device further has a receiving device, as well as at least a second support element, which is arranged outside the vehicle body component in the transverse direction of the vehicle. The second support element is provided on the transverse support and extends from the transverse support toward the rear, in an initial state of the support device, in which the support device is not deformed as a result of an accident. The second support element is spaced away from the first support element and, as a result of a corresponding application of force due to an accident, movable at least partially into the receiving device and thereby into a support relationship with the first support element.

If, for example, the accident-caused force application to the support device, in the event of a frontal collision, such as a small-overlap crash or an oblique crash, exceeds a predefinable load level, an accident-caused rearward displacement of the transverse support will occur. This is because the latter will absorb this accident-caused load or accident energy. Because of this accident-caused rearward displacement, the transverse support and the second support element arranged at the transverse support are moved toward the rear in the longitudinal direction of the vehicle and thereby in the direction of the vehicle body component and the first support element held on the latter. This eliminates the distance between the support elements provided in the initial state, and the second support element is at least indirectly supported on the first support element.

The accident-caused application of force therefore results in at least one transverse force component, which extends at least essentially in the transverse direction of the vehicle and acts upon the front end and by means of which the passenger motor vehicle is rotated, for example, about the vertical direction of the vehicle about the accident partner or obstacle. As result, excessive intrusions into the occupant compartment of the passenger motor vehicle can be avoided, so that the occupants of the passenger motor vehicle can be protected. The support device and, particularly, the support elements have an effect particularly in the case of a small-overlap crash or an oblique crash. However, since the support elements are spaced away from one another in the initial condition and are therefore not supported on one another, the support elements do not impair other accident situations, i.e. accident situations which differ from a small-overlap crash and an oblique crash, so that an advantageous accident behavior in the case of such other accident situations can be implemented, for example, in the case of a frontal collision with a large width overlap or a full width overlap.

Since the support elements are arranged in the transverse direction of the vehicle laterally outside the vehicle body component and therefore of the respective longitudinal supports, the support device takes effect particularly in the case of a small-overlap crash and an oblique crash, because the support elements will then support one another and, for example, become wedged. As a result, a transverse force support can be realized, so that, for protecting the occupants, the passenger motor vehicle is rotated about the accident partner or the obstacle.

In a further development of the invention, it was found to be advantageous for the second support element to extend in the longitudinal direction of the vehicle from a forward outer end toward a rearward inner end. This means that the second support element extends diagonally with respect to the longitudinal direction of the vehicle, the forward end of the second support element being arranged farther outside in the transverse direction of the vehicle than the rearward end. As a result, it becomes possible in a particularly advantageous manner to implement a transverse force component or a transverse force support in order to achieve a particularly advantageous movement of the passenger motor vehicle as a whole.

For implementing a particularly advantageous accident behavior, it is provided in a further embodiment of the invention that the first support element extends diagonally with respect to the longitudinal direction of the vehicle. As a result of this diagonal course, a transverse force component can be particularly advantageously generated in the case of an accident, so that the passenger motor vehicle can be rotated, for example, about the accident partner or the obstacle.

It is further advantageous for the second support element to have a first length area arranged in the receiving device in the initial condition and a second length area adjoining the first length area and arranged outside the receiving device in the initial condition. The second length area can be moved into the receiving device as a result of the accident-caused application of force. In other words, the second support element, i.e. the first length area, is situated in the receiving device already in the initial condition, in which case, also the second length area is moved into the receiving device in the event of a frontal collision. It thereby becomes possible that, during the accident-caused application of force, the support elements become particularly advantageously wedged and thereby implement a desired supporting function.

In order to keep the number of parts and the mounting expenditures of the support device particularly low, it is provided in an embodiment of the invention that the first support element is constructed in one piece on the vehicle body component. This also generates, for example, a particularly advantageous force path, which benefits the accident behavior.

As an alternative, it is contemplated that the first support element is designed as a structural element that is constructed separately from the vehicle body component and is fastened to the vehicle body component. In other words, the first support element is then an add-on part which, in line with the demands, can be mounted on the vehicle body component.

A further advantageous embodiment provides that the second support element is constructed in one piece with the transverse support in order to thereby implement an advantageous force path.

As an alternative, it is contemplated that the second support element is constructed as a structural element separately from the transverse support and fastened to the transverse support. Here, the second support element is an add-on component with which the transverse support can be equipped in line with the demands.

It was finally found to be advantageous for at least one of the support elements, i.e. the first support element and/or the second support element, to be constructed as a hollow profile. A particularly advantageous rigidity of the at least one support element can thereby be implemented, so that a particularly advantageous transverse force support can be made possible.

A passenger motor vehicle having at least one support device according to the invention is also part of the invention. Advantages and advantageous embodiments of the support device according to the invention are to be considered as advantages and advantageous embodiments of the passenger motor vehicle according to the invention and vice-versa.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical or functionally identical elements are provided with the same reference symbols.

Figure 1:
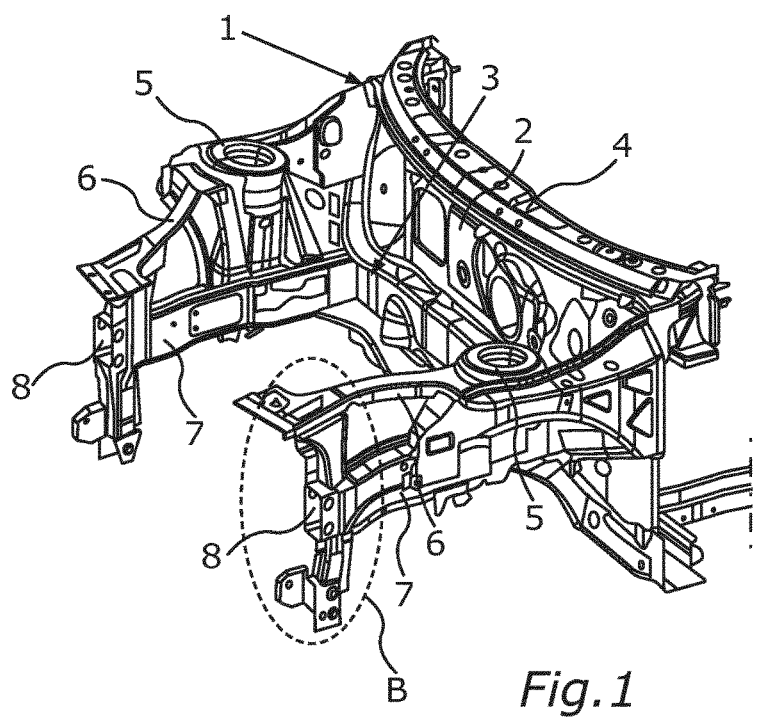
FIG. 1 is a schematic perspective front view of a front end structure of a passenger motor vehicle, comprising two lateral vehicle body components extending at least essentially in the vertical direction of the vehicle, by which respective, laterally assigned longitudinal support elements of a corresponding longitudinal support plane are connected with one another, as well as respective first support elements of a support device arranged on the vehicle body components for a front end of the passenger motor vehicle.

In a schematic and perspective front view, FIG. 1 shows a front end structure 1 for a front end of a passenger motor vehicle. The front end structure 1 includes a separating wall 2, which is also called a splashboard. In the finished state of the passenger motor vehicle, the interior of the passenger motor vehicle is separated by the separating wall 2 from an engine compartment 3 arranged in front of the interior in the longitudinal direction of the vehicle. At least one drive assembly for driving the passenger motor vehicle can be arranged in the engine compartment 3. Furthermore, the front end structure 1 includes a windshield transverse support 4 to which a windshield of the passenger motor vehicle can be fastened. In this case, the windshield transverse support 4 adjoins the separating wall 2 in the vertical direction of the vehicle.

The front end structure 1 further includes dome elements 5, which are also called suspension strut domes. Spring and/or shock absorber elements, particularly spring struts, of a chassis of the passenger motor vehicle, can be supported on the dome elements 5. In addition, the front end structure 1 includes lateral upper longitudinal support elements 6 of an upper longitudinal support plane. The upper longitudinal support elements 6 are support carriers, which are also called wheel house support carriers. The front end structure 1 further includes longitudinal support elements 7 of a second longitudinal support plane. The front end structure 1 is part of the body of the passenger motor vehicle, so that the longitudinal support elements 6 and 7 are vehicle body components. The front end structure 1 finally includes further vehicle body components 8, which at least essentially extend in the vertical direction (z-direction) of the vehicle. Since the vehicle body components 8 extend at least essentially in the vertical direction of the vehicle, they are also called towers or vehicle body towers.

FIG. 1 illustrates that the upper longitudinal support elements 6 are linked on one side to the dome elements 5 and are linked on the other side to the vehicle body components 8. The longitudinal support elements 7 are also linked to the vehicle body components 8, so that the longitudinal support elements 6 and 7 and thereby the respective longitudinal support planes are connected with one another by way of the vehicle body components 8. The longitudinal support elements 7 are, for example, engine mounts on which the above-mentioned drive assembly is disposed in the finished state of the passenger motor vehicle. As an alternative or in addition, in the finished state of the passenger motor vehicle, for example, wheel steering guides for wheel guidance, particularly the front wheels, of the passenger motor vehicle are hinge-connected to the front-axle support 9.

Figure 2:
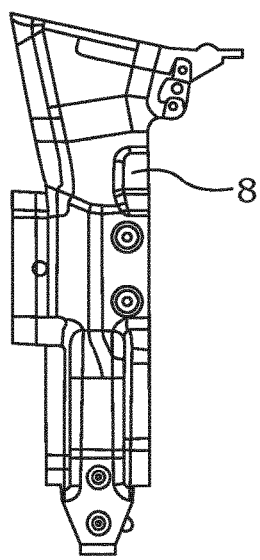
FIG. 2 is a schematic lateral view of one of the vehicle body components.

In a schematic lateral view, FIG. 2 shows one of the vehicle body components 8. The vehicle body component 8 illustrated in FIG. 2 is, for example, the left vehicle body component 8 relative to the forward-travel direction, which vehicle body component 8 is arranged in an area marked B in FIG. 1.

Figure 3:
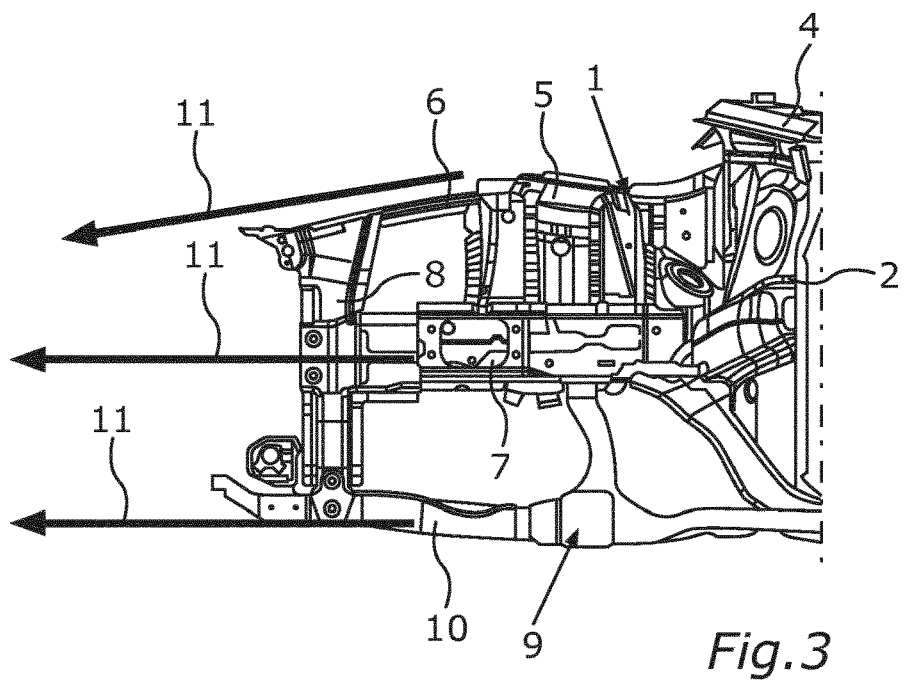
FIG. 3 is a schematic lateral view of the front end structure having a front axle support held on the front end structure.

FIG. 3 illustrates the front end structure 1 in a schematic lateral view. A front-axle support 9 is fastened to the front end structure 1. For example, the front axle support 9 is not a component of the vehicle body and also not a component of the front end structure 1, but rather an add-on part, which is joined at least to the front end structure 1.

The front axle support 9 includes, for example, two longitudinal support elements of a lower longitudinal support plane, which are spaced with respect one another in the transverse direction of the vehicle, in which case, of the longitudinal support elements of the front axle support 9, the longitudinal support element that is on the left relative to the forward travel direction can be recognized and is marked with the reference number 10. The longitudinal support plane of the longitudinal support element 6 is therefore an upper longitudinal support plane, the longitudinal support plane of the longitudinal support elements 10 being a lower longitudinal support plane. The longitudinal support elements 6, 7 and 10 are arranged above one another in the vertical direction of the vehicle, or consecutively, so that the respective longitudinal support planes are also arranged above one another in the vertical direction of vehicle or are arranged consecutively. The longitudinal support plane of the longitudinal support elements 7 is thereby arranged in the vertical direction of the vehicle between the upper longitudinal support plane and the lower longitudinal support plane, because the longitudinal support elements 7 are arranged between the upper longitudinal support elements 6 and the lower longitudinal support elements 10.

FIG. 3 illustrates that also the longitudinal support elements 10 of the lower longitudinal support plane or of the front axle support 9 are linked to the vehicle body components, so that the lateral longitudinal support elements 6, 7 and 10 are mutually connected by way of the respective lateral vehicle body component 8. In other words, for example, the respective vehicle body component 8 extends at least essentially in the vertical direction of the vehicle from the upper longitudinal support plane by way of the middle longitudinal support plane to the lower longitudinal support plane or vice-versa.

FIG. 3 indicates via direction arrows 11 that, by way of the respective longitudinal support element 6, 7 and 10 respectively, a respective load path can form, which is also called a structure path. By way of this load path, for example, accident-caused forces can be absorbed and deflected. By way of the structure paths, accident-caused loads, i.e. accident energy can be introduced into the vehicle body, so that the structure paths are also called vehicle body paths or vehicle body load paths. The respective vehicle body component 8 is therefore a structural component, which connects the three vehicle body load paths.

Figure 4:
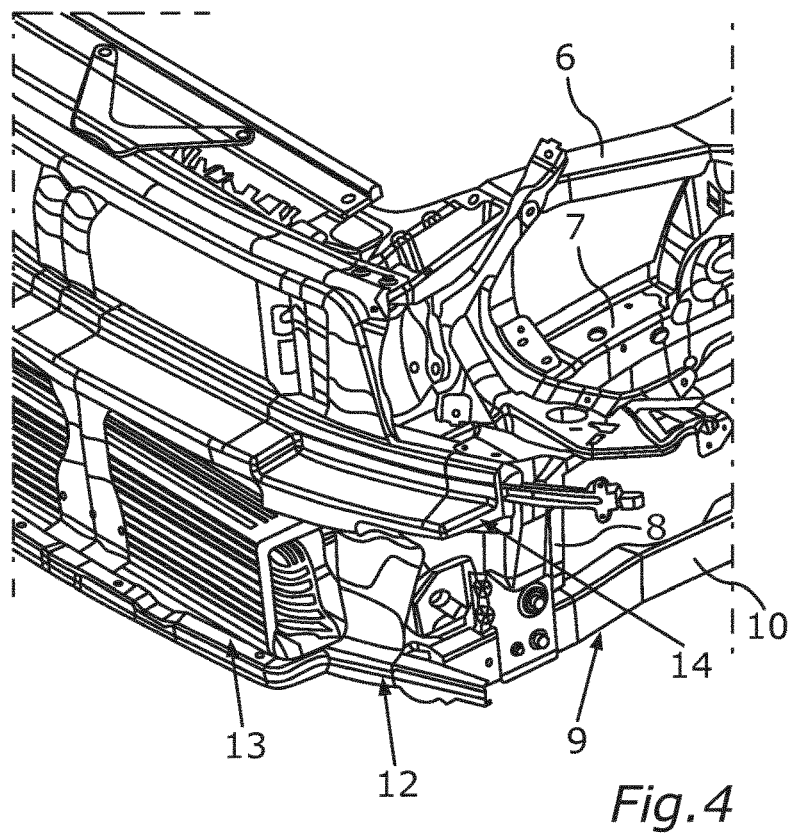
FIG. 4 is a cutout-type schematic and perspective front view of a front end module joined to the body of the passenger motor vehicle, which front end module comprises a transverse support of a bumper, respective second support elements corresponding with the first support elements being fastened to the transverse support.

FIG. 4 is a schematic and perspective front view of a front end module 12 of the passenger motor vehicle. The front end module 12 is not a component of the vehicle body, but an add-on part, which is joined to the vehicle body within the scope of the production of the passenger motor vehicle. In the present case, the front end module 12 is joined in a joining direction with the front end structure 1 and the axle support 9, this joining direction extending in the longitudinal of the vehicle (x-direction). For example, the front end module 12 is joined in at least a first joining location with the respective upper longitudinal support element 6. In at least a respective second joining location, the front end module 12 is joined with the respective longitudinal supports 7 (engine mounts), and in at least a respective third joining location, the front end module 12 is joined with the respective lower longitudinal support element 10.

The front end module 12 includes, for example, a cooling module 13 for cooling the drive assembly. The front end module 12 further includes a transverse support 14 of a bumper. In the finished state of the passenger motor vehicle, the transverse support 14 extends at least essentially in the transverse direction of the vehicle. The transverse support 14 also is called a bending transverse support. The above-mentioned bumper includes at least one covering element, which is also called a bumper covering. By means of the bumper covering, the bending transverse support (transverse support 14) is outwardly covered in the finished state of the passenger motor vehicle.

The transverse support 14 is held, for example, by way of respective energy absorption elements, on the longitudinal support elements 7. For example, in the event of a frontal collision of the passenger motor vehicle with an accident partner or an obstacle, accident-based loads or accident energy act upon the transverse support 14, so that an accident-caused application of force to the transverse support 14 will occur. The accident energy is distributed, for example, by means of the transverse support 14 in the transverse direction of the vehicle and is deflected to the energy absorption elements. Because the energy absorption elements are supported, for example, in the longitudinal direction of the vehicle toward the rear on the longitudinal support elements 7, the energy absorption elements are deformed by the accident-caused application of force. As a result, the energy absorption elements convert at least a portion of the accident energy to deformation energy, so that accident energy is absorbed or reduced by means of the energy absorption elements. The occupants of the passenger motor vehicle can thereby be protected.

Figure 5:
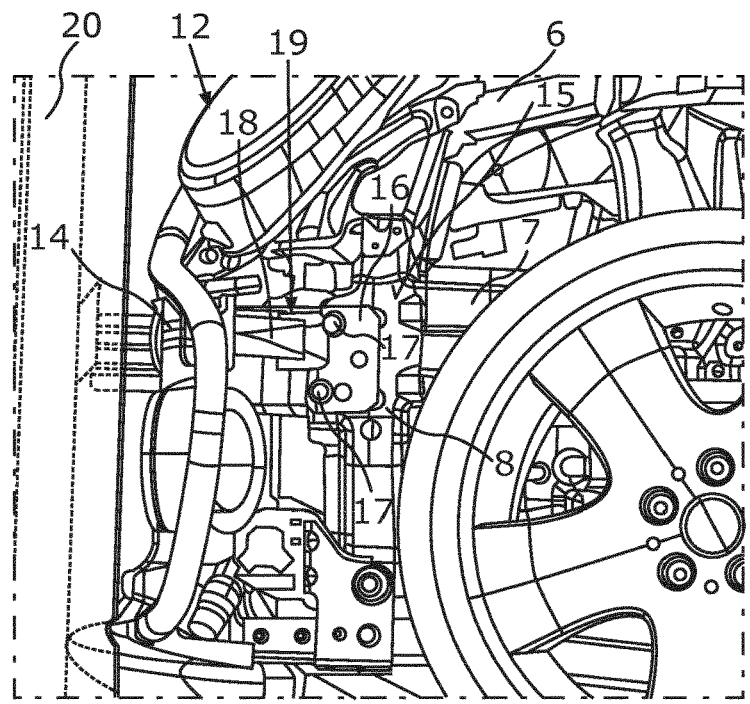
FIG. 5 is a cutout-type schematic lateral view of the support device.
Figure 6:
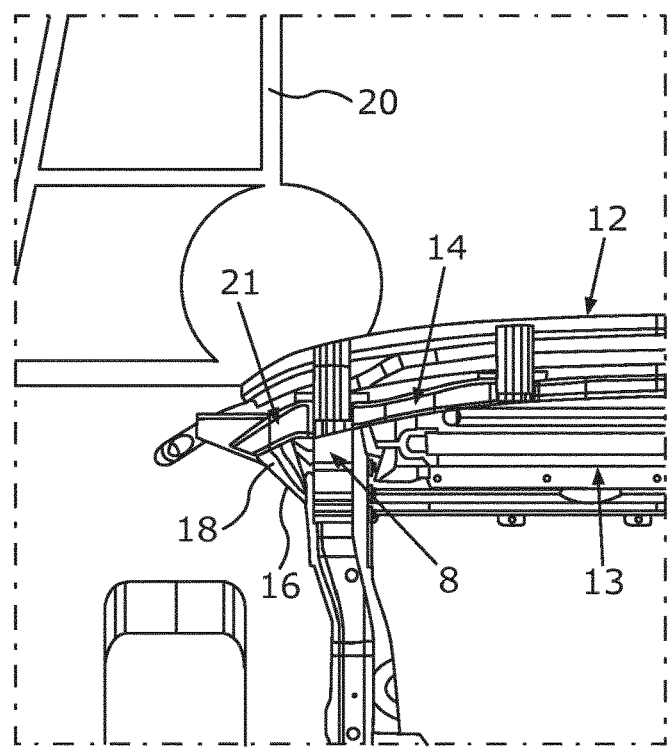
FIG. 6 is a cutout-type schematic top view of the support device.
Figure 7:
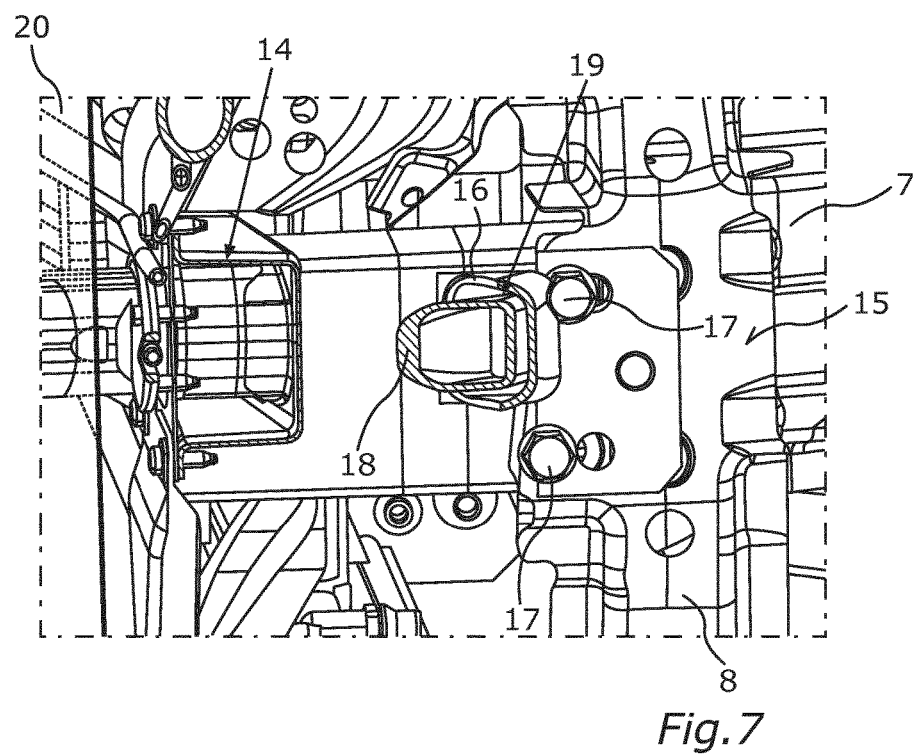
FIG. 7 is a cutout-type schematic and cut lateral view of the support device.

In order to now implement a particularly advantageous accident behavior of the passenger motor vehicle, particularly in the case of a frontal collision with a small width overlap, the passenger motor vehicle includes a support device. In this case, at least the longitudinal support elements 6, 7 and 10 as well as the vehicle body components 8 and the transverse support 14 are components of this support device. As illustrated in FIG. 5, the support device further includes respective first support elements 16, which are provided on the respective vehicle components 8 on a respective side 15 of the respective vehicle component 8 facing outward in the transverse direction of the vehicle. FIGS. 5, 6 and 7 show the support element 16, which is on the left relative to the forward travel direction and is provided on the left vehicle body component 8. In this case, the respective first support element 16 is constructed as a structural element constructed separately from the respective vehicle body component 8 and fastened to the vehicle body component 8. As an alternative, it is contemplated that the respective first support element 16 is constructed in one piece with the respective vehicle body component 8.

However, in the present case, the first support element 16 is an add-on part which is arranged and supported on the side 15 of the vehicle body component 8 facing outward in the transverse direction of the vehicle. In this case, the first support element 16 is held on the vehicle body component 8 in such a manner that the first support element 16 is screwed to the corresponding vehicle body component 8. For this purpose, fasteners such as screws or bolts 17 are provided, by means of which the support element 16 is fastened to the vehicle body component 8. Furthermore, the respective first support element 16 is made of a metallic material.

For each first support element 16, the support device further includes a second support element 18, which corresponds with the first support element 16. The second support element 18 is arranged in the transverse direction of the vehicle outside the respective vehicle body component 8. It is provided on the transverse support and extends from the transverse support 14 toward the rear in the direction of the first support element 16 arranged in the longitudinal direction of the vehicle behind the transverse support 14. The respective second support element 18 is therefore a component of the front end module 12 and is joined with the latter. In an initial state of the of the support device, the respective second support element 18 is spaced away from the respective corresponding first support element 16 and, as a result of a corresponding accident-caused application of force, can be moved at least partially into a receiving device 19 of the first support element 16, which is particularly easily visible in FIGS. 5 and 7. In the present case, the respective second support element 18 is constructed as a structural element separately from the transverse support 14 and fastened to the transverse support 14. As an alternative, it is contemplated that the respective second support element 18 is constructed in one piece with the transverse support 14.

In the present case, the support elements 16 and 18 are made of a metallic material, particularly of steel. As illustrated in FIG. 7, the support elements 16 and 18 are each designed as a hollow profile, in order to be able to implement sufficient rigidity and thereby a support function.

FIGS. 5, 6 and 7 illustrate the support device in an undeformed state, which corresponds to the above-mentioned initial state. In this case, the respective first support element 16 has the receiving device 19, in which a first length area of the second support element 18 is arranged or received as early as in the initial state or undeformed state. However, the second support element 18 is spaced away from the first support element 16, so that the second support element 18 is not supported on the first support element 16.

In the manner of a cutout, FIGS. 5 to 7 show an obstacle 20 with which the passenger vehicle frontally collides, for example, within the scope of an accident test. It is particularly easily recognizable in FIG. 6 that, in the case of this frontal collision, only a very small portion of the width of the passenger motor vehicle extending in the transverse direction of the vehicle overlap with the obstacle in the longitudinal direction of the vehicle toward the front, so that, in the present case, the passenger motor vehicle collides with the obstacle within the scope of a so-called small-overlap crash, i.e. a frontal collision with a small width overlap. Furthermore, it is particularly easily recognizable from FIG. 6 that the transverse support 14 projects beyond the respective lateral vehicle body components toward the outside, so that at least a respective lateral length area 21 of the transverse support 14 is arranged in the transverse direction of the vehicle outside the vehicle body component 8. In this case, the respective second support element 18 is arranged in this outer lateral length area 21.

It is particularly easily recognizable in FIGS. 5 and 6 that the first length area of the respective second support element 18 received in the initial state in the receiving device 19 in the longitudinally extending direction of the second support element 18 is adjoined by a second length area, which, in the initial state, is arranged outside the receiving device 19. The second support element 18 further extends in the transverse direction of the vehicle from the forward exterior to the rearward interior, so that a first end of the support element 18 facing the transverse support 14, in the transverse direction of the vehicle is arranged farther on the outside than a rearward second end of the support element 18, which faces the first support element 16. In addition, the first support element 16 also extends diagonally to the longitudinal direction of the vehicle and, in this case, is designed as a so-called "tulip", in which the first length area of the second support element 18 is accommodated already in the initial state.

When now the frontal collision of the passenger motor vehicle, particularly of the support device, with the obstacle occurs, as illustrated in FIG. 6, an accident-caused application of force to the support device and particularly to the transverse support 14 will take place.

When this accident-caused application of force exceeds a predefinable load level, which can be defined, for example, by a corresponding further development of the support device, and wherein the application of force depends on the speed at which the passenger motor vehicle collides with the obstacle 20, the accident-caused application of force will lead to an accident-caused rearward displacement of the transverse support 14 and thereby of the second support element 18. In this case, particularly the length area 21 and, with the latter, the support element 18 arranged in the length area 21 on the transverse support 14, move toward the rear and particularly in the direction of the first support element 16. By means of this accident-caused movement, the initially provided distance between the support elements 16 and 18 is eliminated, so that the second support element 18 enters a support relationship with the first support element 16. This leads to a mutual wedging of the support elements 16 and 18, which results in a transverse force component. This transverse force component acts in the transverse direction of the vehicle, for example, from the left support element 16 recognizable in FIG. 6 to the right support element not recognizable in FIG. 6. This transverse force component causes a rotation of the passenger motor vehicle, particularly about the vertical direction of the vehicle, whereby the passenger motor vehicle is rotated about the obstacle 20 for the protection of its occupants. The passenger motor vehicle therefore does not slide off the obstacle 20 by way of the support device, but is rotated about the obstacle 20.

An advantageous accident behavior of the passenger motor vehicle can thereby be implemented particularly in the case of a small-overlap crash and in the case of an oblique crash. However, since in the initial state the support elements 16 and 18 are spaced away from one another, other accident situations, such as a frontal collision with a large or full width overlap, are not impaired by the support elements 16 and 18, so that, also in different accident situations, an advantageous accident behavior of the passenger motor vehicle can be implemented.

LIST OF REFERENCE NUMBERS

1 Front end structure
2 Separating wall
3 Engine compartment
4 Windshield transverse support
5 Dome element
6 Longitudinal support element
7 Longitudinal support element
8 Vehicle body component
9 Front axle support
10 Longitudinal support element
11 Directional arrow
12 Front end module
13 Cooling module
14 Transverse support
15 Side
16 First support element
17 Screw
18 Second support element
19 Receiving device
20 Obstacle
21 Length area The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A support device for a front end of a passenger motor vehicle, comprising:
   at least one vehicle body component extending in a vertical direction of the vehicle, by which vehicle component respective laterally assigned longitudinal support elements of corresponding longitudinal support planes are mutually connected;
   a transverse support of a front end module held at a body of the passenger motor vehicle;
   at least a first support element, which is provided on the vehicle body component on a side facing outward in the transverse direction of the vehicle, the first support element having a receiving device; and
   at least a second support element, which is arranged outside the vehicle body component in the transverse direction of the vehicle, wherein
   the second support element is provided on the transverse support and extends from the transverse support toward the rear,
   in an initial state of the support device, the second support element is spaced away from the first support element, with a first length area of the second supporting element arranged in the receiving device in the initial state and a second length area adjoining the first length area and arranged outside the receiving device in the initial state, and
   as a result of a corresponding application of force due to an accident, the second length area is movable into the receiving device and thereby into a support relationship with the first support element.

2. The support device according to claim 1, wherein the second support element extends in the longitudinal direction of the vehicle from a forward outer end to an rearward inner end.

3. The support device according to claim 2, wherein the first support element extends diagonally with respect to the longitudinal direction of the vehicle.

4. The support device according to claim 1, wherein the first support element extends diagonally with respect to the longitudinal direction of the vehicle.

5. The support device according to claim 1, wherein the first support element is constructed in one piece with the vehicle body component.

6. The support device according to claim 1, wherein the first support element is constructed as a structural element that is constructed separately from the vehicle body component and is fastened to the vehicle body component.

7. The support device according to claim 1, wherein the second support element is constructed in one piece with the transverse support.

8. The support device according to claim 1, wherein the second support element is constructed as a structural element that is constructed separately from the transverse support and fastened to the transverse support.

9. The support device according to claim 1, wherein at least one of the first and second support elements is constructed as a hollow profile.

10. A passenger motor vehicle, comprising at least one support device according to claim 1.

11. A support device for a front end of a passenger motor vehicle, comprising:
   at least one vehicle body component extending in a vertical direction of the vehicle, by which vertically extending vehicle body component respective laterally assigned upper, middle and lower longitudinal support elements of corresponding upper, middle and lower longitudinal support planes are mutually connected;
   a transverse support of a front end module held at a body of the passenger motor vehicle;
   at least a first support element, which is provided on the vertically extending vehicle body component between the upper and lower longitudinal support planes on a side facing outward in the transverse direction of the vehicle, the first support element having a receiving device; and
   at least a second support element, which is arranged outside the vehicle body component in the transverse direction of the vehicle, wherein
   the second support element is provided on the transverse support and extends from the transverse support toward the rear,
   in an initial state of the support device, the second support element is spaced away from the first support element, and
   as a result of a corresponding application of force due to an accident, the second support element is movable at least partially into the receiving device and thereby into a support relationship with the first support element.

* * * * *